(12) United States Patent
Catton

(10) Patent No.: US 6,450,754 B1
(45) Date of Patent: Sep. 17, 2002

(54) BULK BAG DISCHARGER FOR DRY FLOWABLE MATERIALS

(75) Inventor: Guy Catton, Grafton (CA)

(73) Assignee: CP Motion Products, Inc., Pickering (CA)

( * ) Notice: Subject to any disclaimer, the term of this patent is extended or adjusted under 35 U.S.C. 154(b) by 0 days.

(21) Appl. No.: 09/598,985

(22) Filed: Jun. 21, 2000

(51) Int. Cl.⁷ ................................................ B65G 65/04
(52) U.S. Cl. .................................... 414/415; 222/185.1
(58) Field of Search ......................... 414/415; 222/105, 222/107, 181.1, 181.2, 185.1

(56) References Cited

U.S. PATENT DOCUMENTS

| | | |
|---|---|---|
| 4,810,156 A | 3/1989 | Pendleton et al. |
| 4,946,071 A | 8/1990 | Poulton |
| 4,953,791 A | 9/1990 | Tada |
| 5,033,706 A * | 7/1991 | Poulton ...................... 414/415 |
| 5,141,135 A | 8/1992 | Volk, Jr. |
| 5,215,228 A | 6/1993 | Andrews et al. |
| 5,341,959 A | 8/1994 | Ellis |
| 5,531,360 A * | 7/1996 | Berdel et al. ............. 222/185.1 |
| 5,647,178 A | 7/1997 | Cline |
| 5,730,448 A | 3/1998 | Swensen et al. |
| 5,735,439 A | 4/1998 | Heinrici et al. |
| 5,826,919 A | 10/1998 | Bravo et al. |
| 5,947,333 A * | 9/1999 | Hoffman et al. .......... 222/185.1 |
| 6,055,781 A * | 5/2000 | Johanson .................. 222/185.1 |
| 6,250,514 B1 * | 6/2001 | Hansson ................... 222/185.1 |

* cited by examiner

Primary Examiner—Joseph E. Valenza
(74) Attorney, Agent, or Firm—Reising, Ethington, Barnes, Kisselle, Learman & McCulloch P.C.

(57) ABSTRACT

A discharge chute for a bulk bag discharger is fabricated of molded plastic. The chute has an upper portion for securement to a bulk bag discharger frame, such that the mid and lower portions of the chute are freely suspended from the frame. The mid portion of the chute includes one flat sidewall, and three elliptical sidewalls. A door is provided in the flat sidewall of the chute for affording operator access to the interior of the chute. A vibrator is mounted on a vibrator mounting plate on one of the elliptical sidewalls of the chute. The lower end of the chute forms a circular outlet opening, and preferably is of stepped configuration so that an operator may selectively remove steps from the outlet end of the chute to provide an outlet opening of desired diameter.

38 Claims, 7 Drawing Sheets

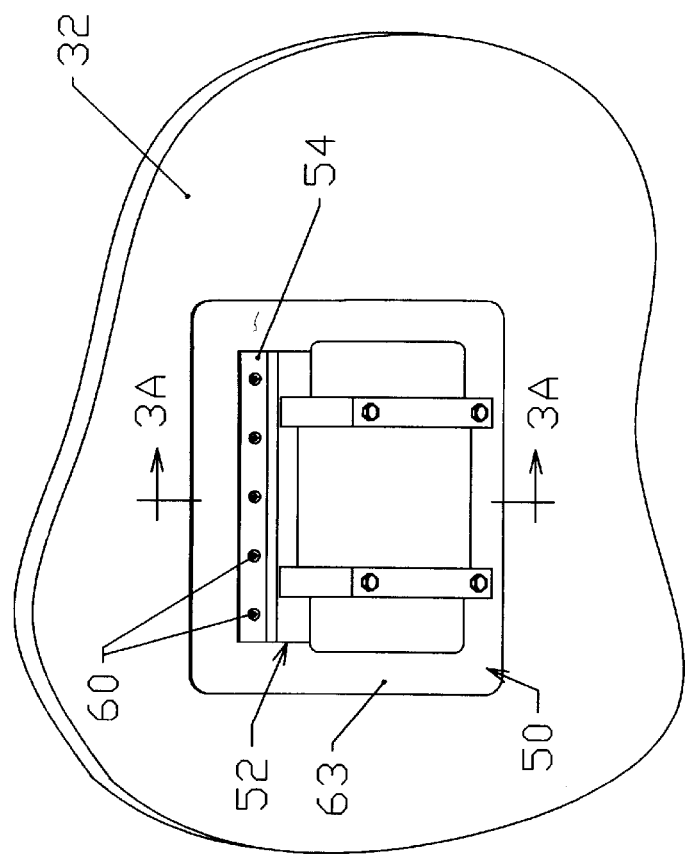
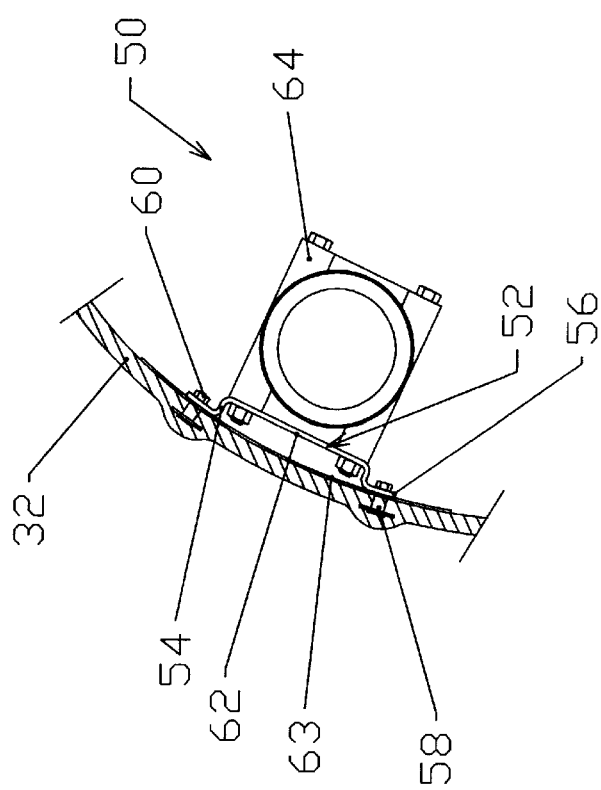

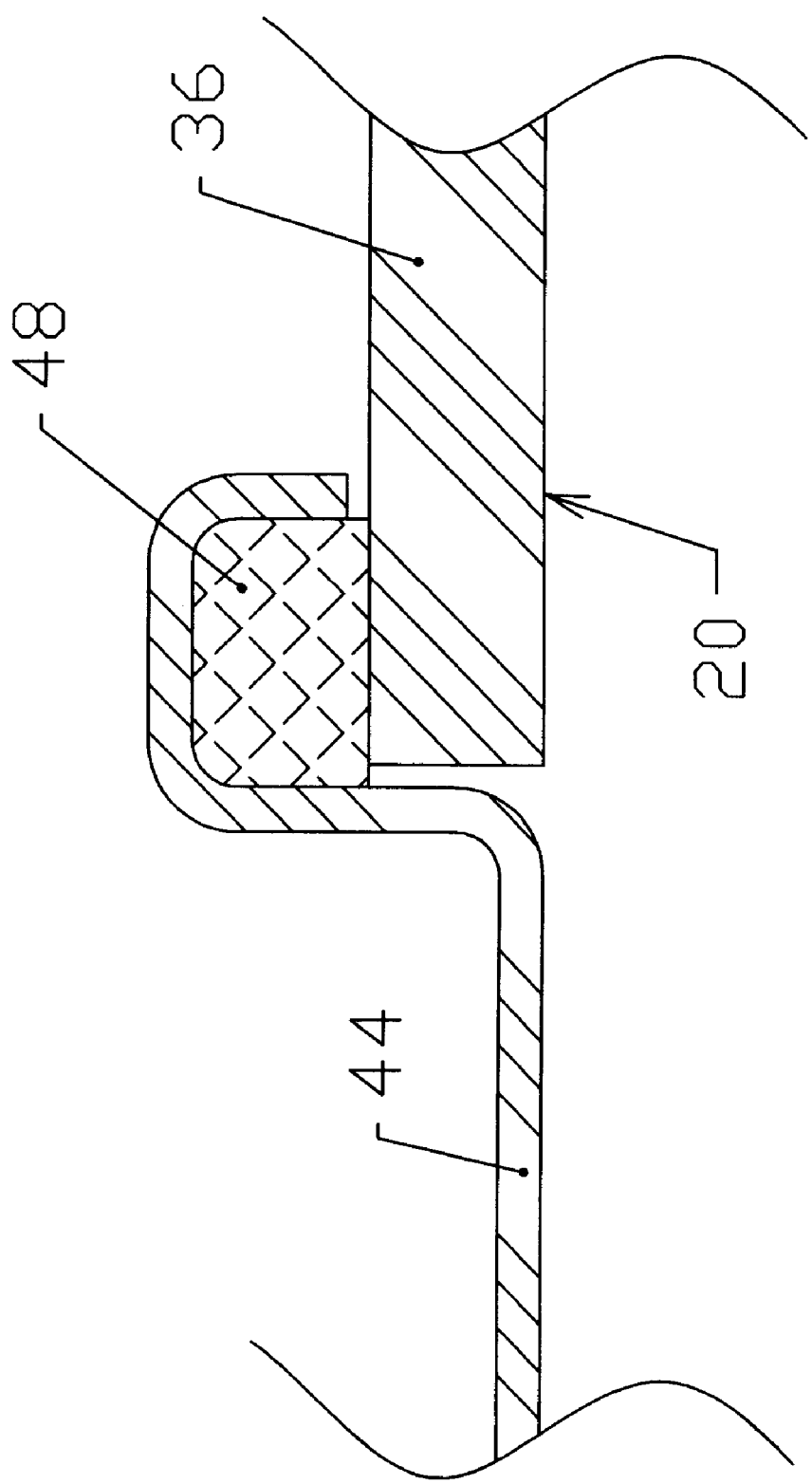

BULK BAG DISCHARGER FOR DRY FLOWABLE MATERIALS

The present invention is directed to bulk bag dischargers for discharging dry flowable materials from flexible intermediate bulk bags, and more particularly to an improved discharge chute for use in such dischargers.

BACKGROUND AND SUMMARY OF THE INVENTION

Bulk bag dischargers typically include a frame for supporting an intermediate bulk bag containing dry flowable material in vertical orientation with a discharge opening of the bag disposed at the lower end of the suspended bag. A downwardly and inwardly tapering discharge chute is carried by the frame for receiving the lower end of the bag and guiding material discharged from the bag to a lower outlet end of the chute. Among the objects of the present invention are to provide a bulk bag discharger, and particularly a discharge chute, that is fabricated at reduced cost as compared with the prior art, that exhibits a reduced likelihood of blockage by flowable material during use, that exhibits increased operating life, and/or that maybe readily modified by a user in the field to provide a discharge opening of a desired size.

In accordance with one aspect of the present invention, a discharge chute for a bulk bag discharger of the type described above is fabricated of plastic, preferably molded plastic. The chute has an upper portion for securement to the bulk bag discharger frame, such that the mid and lower portions of the chute are freely suspended from the frame. The mid portion of the chute includes one flat sidewall and three elliptical sidewalls. A door is provided in the flat sidewall of the chute for affording operator access to the interior of the chute to untie a bag discharge, for example. A vibrator is mounted on a vibrator mounting plate on one of the elliptical sidewalls of the chute. The lower end of the chute forms a circular outlet opening, and preferably is of stepped configuration so that an operator may selectively remove steps from the outlet end of the chute to provide an outlet opening of desired diameter.

The plastic construction of the chute reduces fabrication cost, and facilitates operator modification of the chute outlet opening to the desired outlet opening diameter. Molded plastic construction of the chute also eliminates points at which material may collect, exhibits good chemical resistance, and permits fabrication of FDA-approved materials such as polyethylene and polypropylene. Provision of three elliptical chute sidewalls, particularly combined with the flat construction of the fourth sidewall, promotes material flow through the discharge chute and reduces the likelihood of material blockage of the discharge chute. The differing sidewall geometries exhibit differing flow characteristics, which in turn greatly reduces any likelihood of material blockage in the chute. A foam sealing gasket is provided around the operator access door on the flat sidewall of the chute to help prevent discharge of dust into the surrounding environment.

The vibrator is secured to the discharge chute by a vibrator mounting plate, which has edge portions secured to inserts molded into the chute sidewall, and a mid portion on which the vibrator is mounted. The mid portion of the bracket is spaced from the chute sidewall so as to permit free circulation of cooling air between the mounting plate and the chute sidewall. Free suspension of the discharge chute within the discharger mounting frame allows free vibration of the chute, further to reduce the likelihood of material blockage at the chute outlet. That is, the discharger body geometry and selection of the material of construction combine to provide an effective method of vibration isolation (suspension) allowing both elimination of vibration isolators and allowing use of a more energy efficient lower horsepower vibrator. An additional steel plate may be mounted between the vibrator mounting plate and plastic discharger body to further distribute stress points and dissipate heat. Molding of the mounting inserts into the chute sidewall, particularly when coupled with the preferred plastic chute material and the method of molding the chute, eliminate cracks, crevices and hollow sections in the chute to prevent collection of material and facilitate acceptance in the food, dairy, pharmaceutical and chemical industries. Multiple mounting points of the vibration mounting plate to the chute reduce plastic fatigue and creep stress around each individual mounting point.

BRIEF DESCRIPTION OF THE DRAWINGS

The invention, together with additional objects, features and advantages thereof, will be best understood from the following description, the appended claims and the accompanying drawings in which:

FIG. 3 is a fragmentary elevational view taken from the direction 3 in FIG. 2;

FIG. 3A is a fragmentary sectional view taken substantially along the line 3A—3A in FIG. 3;

FIG. 4 is a fragmentary sectional view taken substantially along the line 4—4 in FIG. 2;

DETAILED DESCRIPTION OF PREFERRED EMBODIMENTS

Figure 1:
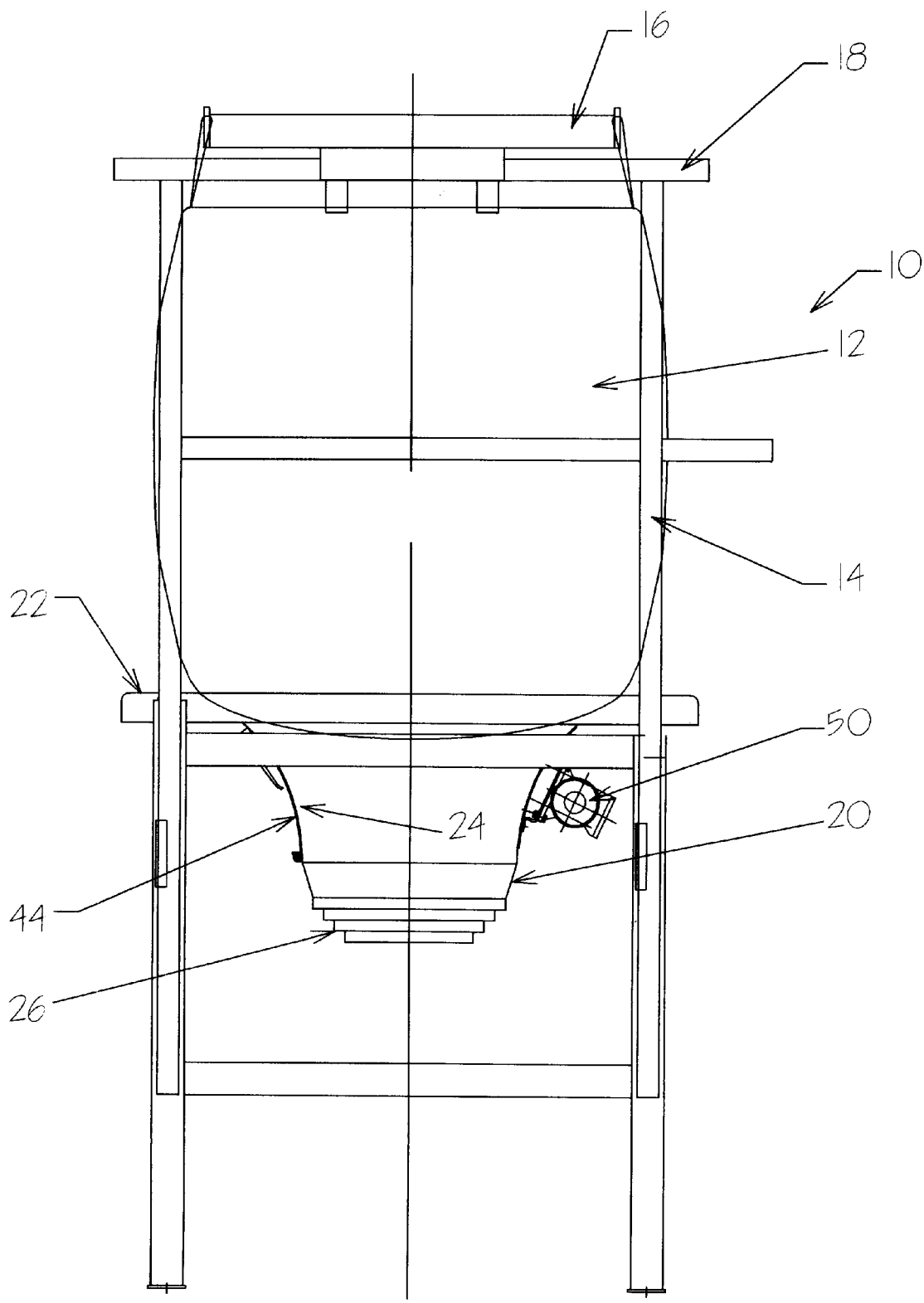
FIG. 1 is an elevational essentially schematic diagram of a bulk bag discharger in accordance with a presently preferred embodiment of the invention.
Figure 2:
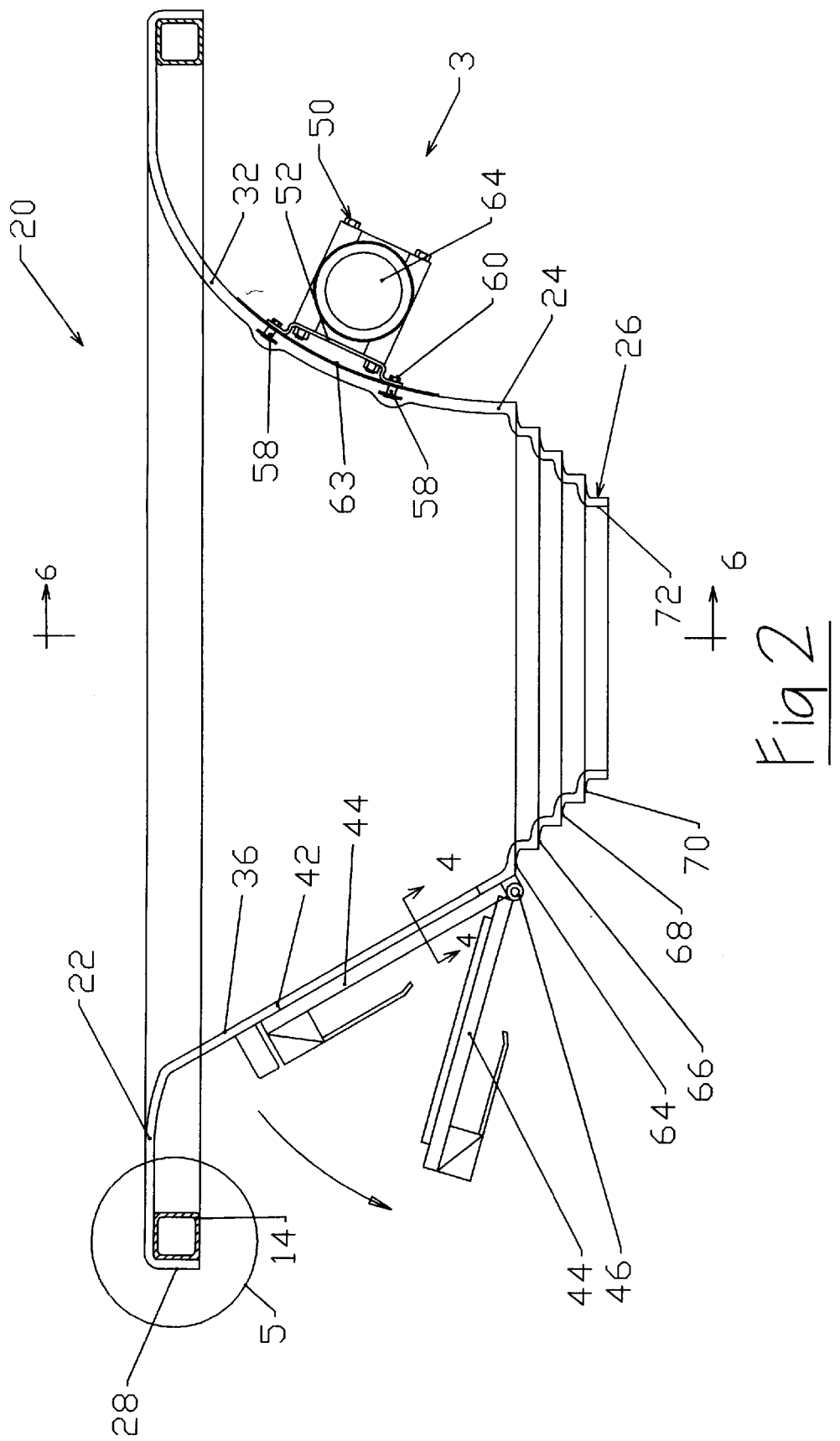
FIG. 2 is a fragmentary sectioned elevational view of the discharge chute and chute mounting arrangement in the bulk bag discharger of FIG. 1.
Figure 5:
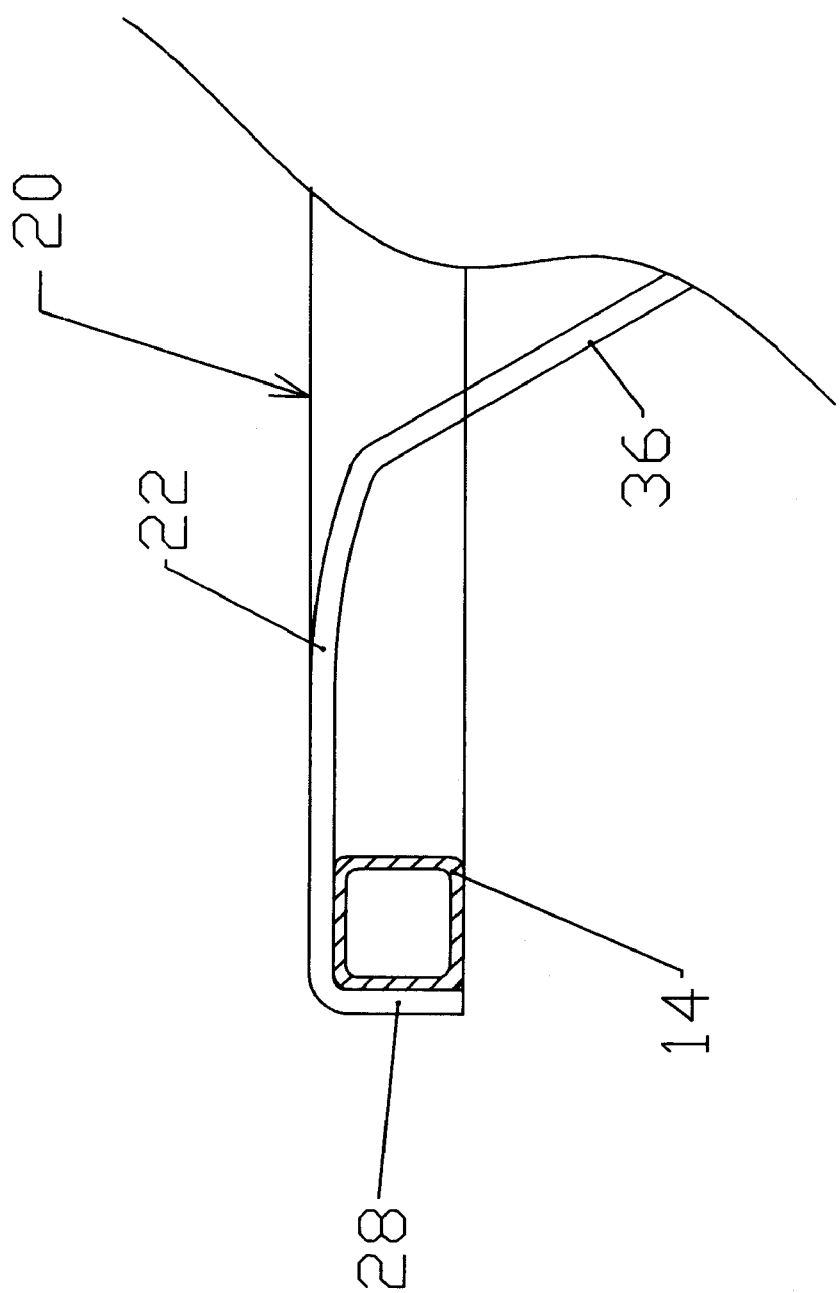
FIG. 5 is a fragmentary sectional view on an enlarged scale of the portion of FIG. 2 within the circle 5.

FIG. 1 illustrates a bulk bag discharger 10 in accordance with one presently preferred embodiment of the invention as comprising a flexible intermediate bulk bag 12 mounted in a support frame 14. The upper end of bag 12 is secured to a cradle assembly 16, which in turn is carried by the upper end 18 of frame 14. A discharge chute 20 is carried by frame 14 for receiving the lower end of bag 12, and for guiding material discharged from bag 12 to and through the lower outlet end of chute 20. To the extent thus far described, bulk bag discharger 10 is of generally conventional construction. Frame 14 preferably is vertically extensible to accommodate bags of differing length. Cradle 16 may be of any suitable construction for removably suspending bag 12 from the upper end 18 of frame 14.

Figure 6:
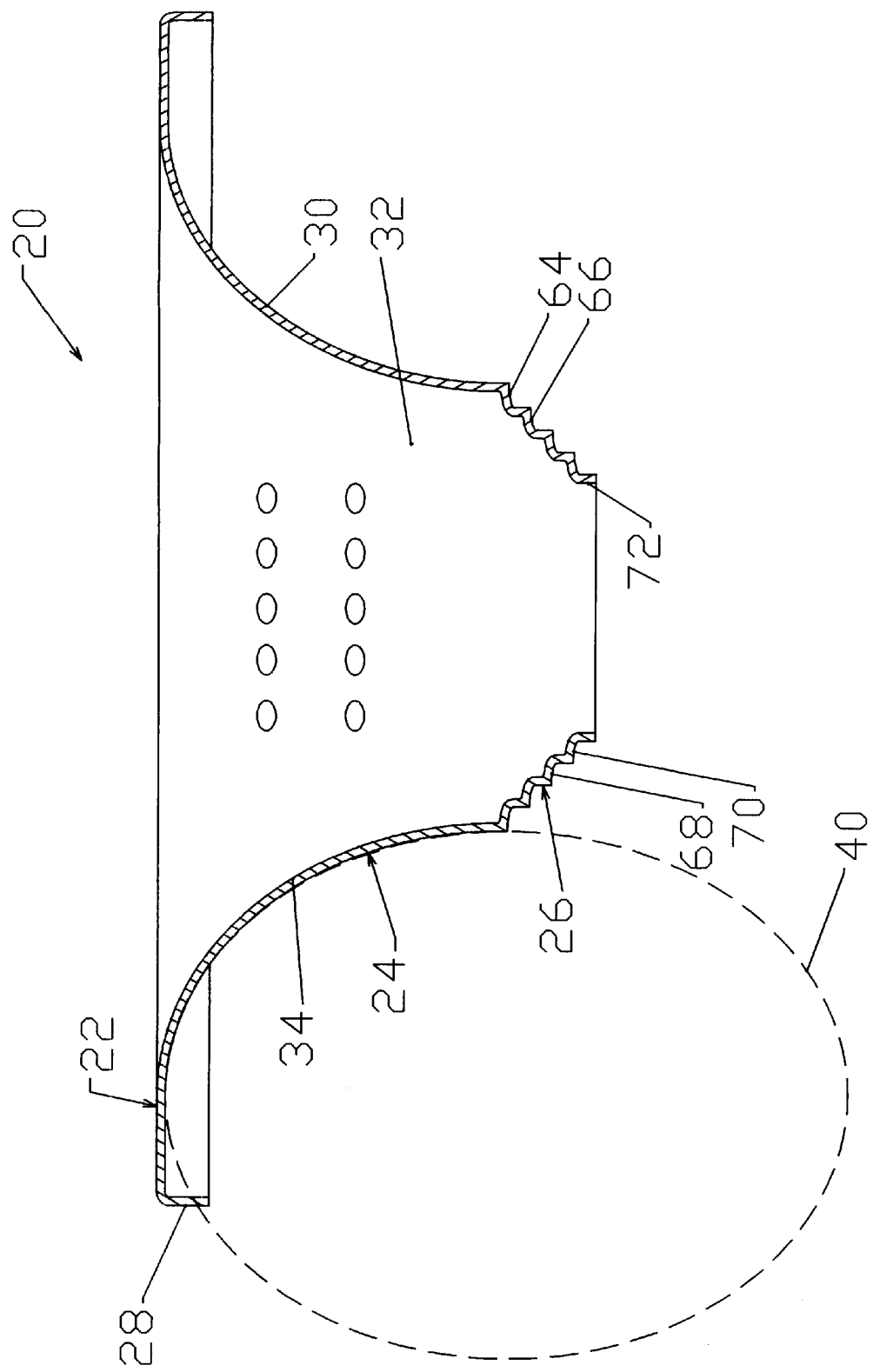
FIG. 6 is a fragmentary sectional view taken substantially along the line 6—6 in FIG. 2.
Figure 7:
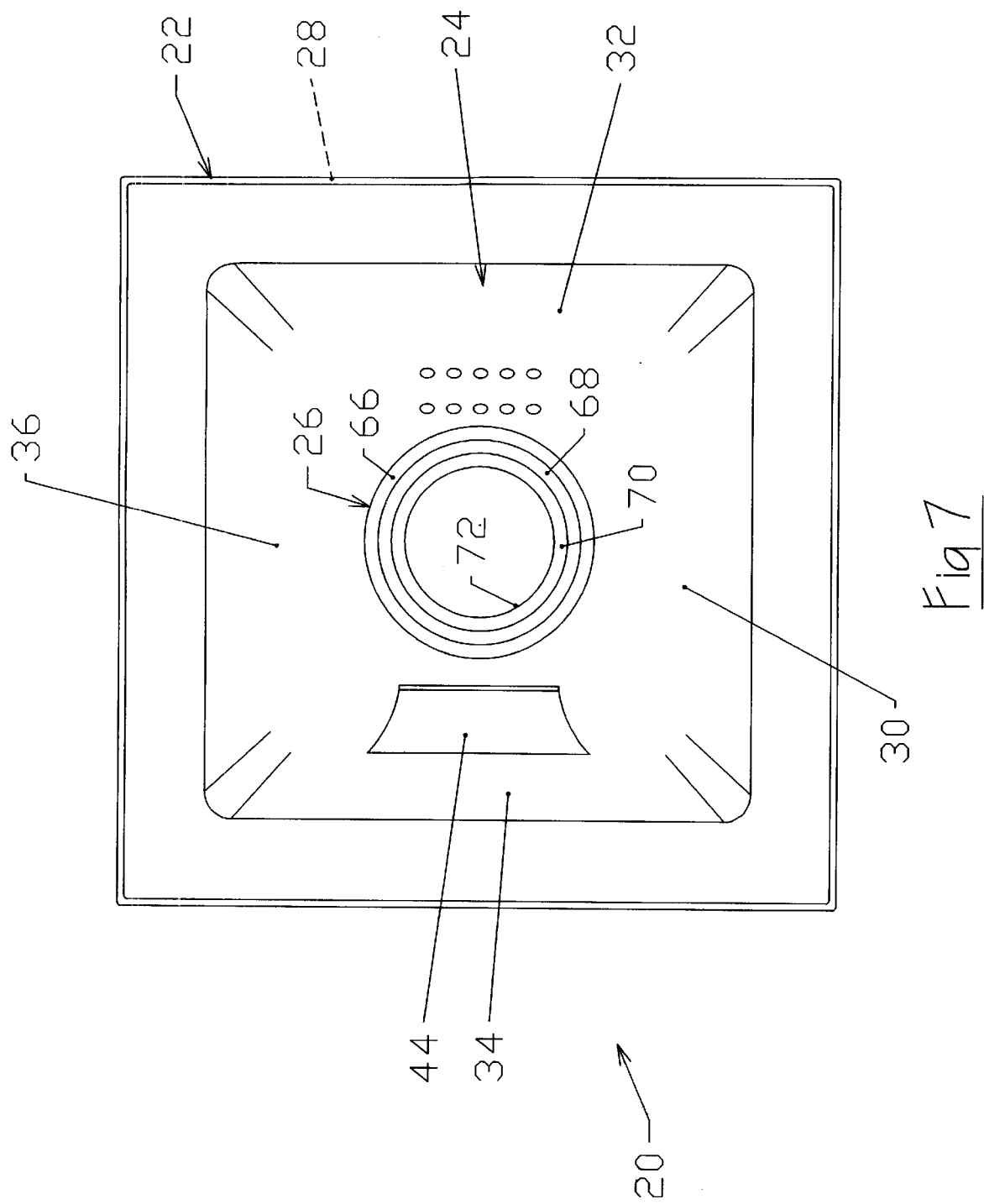
FIG. 7 is a top plan view of the discharge chute illustrated in FIGS. 1–6.

Chute 20, in accordance with the present invention, is of plastic construction, preferably molded plastic construction such as polyethylene or polypropylene. Referring to FIGS. 1–7, chute 20 is of generally uniform sheet-like thickness, having an upper end 22, a tapering mid portion 24 and a lower narrow discharge end portion 26. Upper portion 22 is square and has a peripherally continuous flange 28 that is received over support frame 14, such that the mid and lower portions of chute 20 are freely suspended from the support frame. Mid portion 24 of chute 20 comprises four orthogonally oriented sidewalls that are uniformly blended with each other by concave corner sidewall portions. The four sidewalls of chute 20 include three elliptical sidewalls 30, 32, 34 and a flat sidewall 36. As best seen in FIG. 6, elliptical sidewalls 30, 32 and 34, which are identical, are contoured as one quarter of an ellipse 40 having a major axis oriented parallel to the central axis of the chute and a minor axis oriented perpendicular to the central axis at the chute. Flat sidewall 36 has a rectangular opening 42 over which a door 44 is secured by a pivot hinge 46. A foam rubber gasket 48 is carried around the periphery of door 44 for sealing engagement with the opposing exterior surface of chute sidewall 36 in the closed position of the door illustrated in FIG. 4, and in solid lines in FIG. 2. Foam gasket 48 helps prevent leakage of dust into the surrounding environment as material is discharged through chute 20. Door 44 may be held in the closed position by any suitable means. The door construction allows the interior wall to be smooth and minimize material and dust accumulation.

A vibrator assembly 50 (FIGS. 2–3A) is mounted on one of the elliptical walls, preferably elliptical sidewall 32 opposite flat wall 36 on which door 44 is mounted. Vibrator assembly 50 includes a vibrator support plate 52 that has spaced edge portions 54, 56 exteriorly secured to sidewall 32. Internally threaded inserts 58 are molded into sidewall 32, and edge portions 54, 56 of plate 52 are secured to the inserts by means of screws 60. Plate 52 also has a central portion 62 that is spaced or offset in assembly from the opposing exterior surface of sidewall 32 by means of being raised with respect to edge portions 54, 56 and by means of the exteriorly concaved contour of elliptical sidewall 32. A vibrator motor 64 is secured to central portion 62 of plate 52. The space between central place portion 62 and the opposing surface of chute sidewall 32 facilitates flow of cooling air between the vibrator mounting plate and the plastic material of sidewall 32, which helps reduce plastic creep in the chute sidewall. Molding inserts 58 into sidewall 32 produces embossments on the interior surface of sidewall 32 (FIGS. 2, 3A and 6) that do not inhibit flow of material through the chute or in any way form collection points for material. Mounting of plate 52 to sidewall 32 at multiple points helps reduce the likelihood of creep and distortion at any one mounting point, and helps reduce the likelihood of cracking or fracture of the chute sidewall. An additional steel plate 63 preferably is mounted between the vibrator mounting plate and the plastic discher body further to distribute stress points and dissipate heat.

Lower end 26 of chute 20 (FIGS. 1–2 and 6–7) is of stepped construction. That is, lower end 26 comprises a series of integral steps 64, 66, 68, 70, each of which progressively and incrementally decreases the inside diameter of the circular chute discharge opening 72. These incrementally decreasing discharge diameters are preferably provided in steps that correspond to industry standard discharge openings, such as twenty, eighteen, sixteen, fourteen and twelve inches. Thus, chute 20 is supplied having a minimum discharge opening with all steps 64–70 intact. If the operator desires to provide a discharge opening of larger diameter, the appropriate step is identified, and chute end 26 is cut at the corresponding step. For example, if minimum discharge opening 72 has a diameter of twelve inches, step 70 may be removed to provide a discharge opening diameter of fourteen inches, step 68 may be removed to provide a discharge opening diameter of six teen inches, step 66 may be removed to provide a discharge opening diameter of eighteen inches and step 64 may be removed to provide a discharge opening diameter of twenty inches. This feature of the invention reduces inventory costs and allows the stocking of only one chute construction that may be configured as desired by the installer.

With the chute discharge opening cut to desired size, the chute, including access door 44 and vibrator assembly 50, is assembled to frame 14 as previously described. Free suspension of chute 20 from frame 14 allows free vibration of the chute under control of the vibrator. With a bag 12 mounted on frame 14, door 44 is opened to allow the user to reach into the chute and untie the bag discharge opening. Door 44 is then closed, and the material is permitted to flow from withing the bag. Vibrator assembly 50 is energized only if necessary to prevent bridging of the chute discharge opening by the material. The vibrator is also to promote flow out of the flexible intermediate bulk container spout; this is the point at which material is prone to bridging.

There has thus been disclosed a discharge chute for a bulk bag discharger that fully satisfies all of the objects and aims previously set forth. A number of modifications have been described, and other modifications and variations will readily suggest themselves to persons of ordinary skill in the art. The invention is intended to embrace all such modifications and variations as fall within the spirit and broad scope of the appended claims.

What is claimed:

1. A bulk bag discharger that includes a frame for supporting a bag containing dry flowable material in a vertical orientation with a discharge opening at a lower end, and a downwardly and inwardly tapering discharge chute carried by said frame for receiving the lower end of a bag carried by the frame and guiding material discharged from the bag to a lower outlet end of said chute, characterized in that said chute is of plastic construction and has one flat sidewall and three curved sidewalls.

2. The discharger set forth in claim 1 wherein said curved sidewalls are of elliptical construction.

3. The discharger set forth in claim 2 wherein said curved sidewalls each form one-quarter of an ellipse having a major axis parallel to a central axis of said chute and a minor axis perpendicular to said central axis.

4. The discharger set forth in claim 1 wherein said chute has a square upper end supported by said frame and a lower end forming a circular discharge opening.

5. The discharger set forth in claim 4 wherein said chute is suspended from said upper end secured to said frame.

6. The discharger set forth in claim 4 wherein said lower end has at least one step.

7. The discharger set forth in claim 6 wherein said lower end has a plurality of steps for forming discharge openings of incrementally differing diameters.

8. The discharger set forth in claim 1 further comprising a door in said flat sidewall for providing operator access to the interior of said chute to open the discharge opening of the bag.

9. The discharger set forth in claim 8 to wherein said door has a lower end exteriorly hinged to said flat sidewall and a foam gasket for sealingly exteriorly engaging said flat sidewall.

10. The discharger set forth in claim 1 further comprising a vibrator exteriorly mounted on one of said curved sidewalls of said chute.

11. The discharger set forth in claim 10 further comprising a vibrator mounting plate exteriorly secured to said one sidewall, with said vibrator being mounted on said plate.

12. The discharger set forth in claim 11 wherein said vibrator mounting plate has edge portions secured to said one sidewall and a mid portion, on which said vibrator is mounted, spaced from said one sidewall.

13. The discharger set forth in claim 12 further comprising a second plate secured to said one sidewall between said one sidewall and said mounting plate further to distribute stresses and dissipate heat.

14. The discharger set forth in claim 12 further comprising a plurality of threaded inserts molded into said one sidewall, said edge portions of said plate being secured to said threaded inserts.

15. The discharger set forth in claim 1 wherein said chute is of molded plastic construction.

16. The discharger set forth in claim 15 wherein said molded plastic construction is selected from the group consisting of polyethylene and polypropylene.

17. A discharge chute for a bulk bag discharger having a frame for supporting a bag containing dry flowable material in vertical orientation with a discharge opening at a lower end, said discharge chute being of molded plastic construction and having an upper end for securement to said frame such that middle and lower portions of said chute are freely suspended from the frame, said middle portion having one flat sidewall and three curved sidewalls, and said lower portion forming a circular discharge opening.

18. The chute set forth in claim 17 wherein said curved sidewalls are of elliptical construction.

19. The chute set forth in claim 18 wherein said curved sidewalls each form one-quarter of an ellipse having a major axis parallel to a central axis of said chute and a minor axis perpendicular to said central axis.

20. The chute set forth in claim 18 wherein said lower end has a plurality of steps for forming discharge openings on incrementally differing diameters.

21. The chute set forth in claim 17 further comprising a door in said flat sidewall for providing operator access to the interior of said chute to open the discharge opening of the bag.

22. The chute set forth in claim 21 wherein said door has a lower end exteriorly hinged to said flat sidewall and a foam gasket for sealingly exteriorly engaging said flat sidewall.

23. The chute set forth in claim 17 further comprising a vibrator exteriorly mounted on one of said curved sidewalls of said chute.

24. The chute set forth in claim 23 further comprising a vibrator mounting plate exteriorly secured to said one sidewall, with said vibrator being mounted on said plate.

25. The chute set forth in claim 24 wherein said vibrator mounting plate has edge portions secured to said one sidewall and a mid portion, on which said vibrator is mounted, spaced from said one sidewall.

26. The chute set forth in claim 25 further comprising a second plate secured to said one sidewall between said one sidewall and said mounting plate further to distribute stresses and dissipate heat.

27. The chute set forth in claim 25 further comprising a plurality of threaded inserts molded into said one sidewall, said edge portions of said plate being secured to said threaded inserts.

28. A discharge chute for a bulk bag discharger having a frame for supporting a bag containing dry flowable material in vertical orientation with a discharge opening at a lower end, said discharge chute having an upper end for mounting to the frame such that middle and lower portions of said chute are suspended from the frame, said middle portion having sidewalls that converge toward said lower portion, said lower portion forming a discharge opening, a door in a first of said sidewalls for providing operator access to the interior of said chute to open the discharge opening of the bag, a vibrator exteriorly mounted on a second sidewall of said chute different from said first sidewall, a vibrator mounting plate exteriorly secured to said second sidewall, with said vibrator being mounted on said mounting plate, said vibrator mounting plate having edge portions secured to said second sidewall and a mid portion, on which said vibrator is mounted, spaced from said second sidewall, and a plurality of threaded inserts molded into said second sidewall, said edge portions of said plate being secured to said threaded inserts.

29. The discharge chute set forth in claim 28 wherein said vibrator is mounted on said second sidewall of said chute diametrically opposite said first sidewall.

30. The discharge chute set forth in claim 28 wherein said second sidewall is a curved sidewall. said vibrator being exteriorly mounted on said curved second sidewall.

31. The chute set forth in claim 28 further comprising a second plate secured to said second sidewall between said second sidewall and said mounting plate further to distribute stresses and dissipate heat.

32. The chute set forth in claim 28 wherein said door has a lower end exteriorly hinged to said first sidewall and a foam gasket for sealingly exteriorly engaging said first sidewall.

33. The chute set forth in claim 28 wherein said lower portion has a plurality of steps forming multiple circular discharge openings of incrementally decreasing diameters.

34. A discharge chute for a bulk bag discharger having a frame for supporting a bag containing dry flowable material in vertical orientation with a discharge opening at a lower end, said discharge chute being of molded plastic construction and having an upper end for mounting to the frame such that middle and lower portions of said chute are suspended from the frame, said middle portion having sidewalls that converge toward said lower portion, said lower portion forming a discharge opening, and a vibrator mechanism exteriorly mounted on one of said sidewalls, said vibrator mechanism including a plurality of threaded inserts molded into said one sidewall, a vibrator mounting plate mounted on said inserts and a vibrator mounted on said mounting plate.

35. The discharge chute set forth in claim 34 wherein said vibrator mounting plate has edge portions secured to said inserts and a center portion, on which said vibrator is mounted, spaced from said one sidewall.

36. The chute set forth in claim 35 further comprising a second plate secured to said one sidewall between said one sidewall and said mounting plate further to distribute stresses and dissipate heat.

37. The discharger set forth in claim 15 wherein said molded plastic construction is selected from the group consisting of polyethylene and polypropylene.

38. A discharge chute for a bulk bag discharger having a frame for supporting a bag containing dry flowable material in vertical orientation with a discharge opening at a lower end, said discharge chute having an upper end for mounting to the frame such that middle and lower portions of said chute are suspended from the frame, said middle portion having sidewalls that converge toward said lower portion, said lower portion forming a discharge opening, a door in a first of said sidewalls for providing operator access to the interior of said chute to open the discharge opening of the bag, and a vibrator exteriorly mounted on a second sidewall of said chute different from said first sidewall, said door having a lower end exteriorly hinged to said first sidewall and a foam gasket for sealingly exteriorly engaging said first sidewall.

* * * * *